US010647526B1

(12) United States Patent
Mohammed et al.

(10) Patent No.: US 10,647,526 B1
(45) Date of Patent: May 12, 2020

(54) DECLINE STATION

(71) Applicant: Amazon Technologies, Inc., Seattle, WA (US)

(72) Inventors: Raashid Mohammed, Lynnwood, WA (US); Majid Abdul, Bellevue, WA (US); Eric C. Flagel, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,725

(22) Filed: Dec. 13, 2018

(51) Int. Cl.
| B65G 47/96 | (2006.01) |
| B65G 13/11 | (2006.01) |
| B65G 11/08 | (2006.01) |
| B65G 41/00 | (2006.01) |
| B65G 39/12 | (2006.01) |

(52) U.S. Cl.
CPC ............ *B65G 47/962* (2013.01); *B65G 11/08* (2013.01); *B65G 11/085* (2013.01); *B65G 11/086* (2013.01); *B65G 13/11* (2013.01); *B65G 39/12* (2013.01); *B65G 41/002* (2013.01); *B65G 2812/182* (2013.01)

(58) Field of Classification Search
CPC ..... B65G 11/08; B65G 11/085; B65G 11/086; B65G 47/962; B65G 13/11; B65G 2812/182; B65G 41/002; B65G 39/02
USPC .................................... 193/27, 28; 198/861.5
See application file for complete search history.

(56) References Cited

U.S. PATENT DOCUMENTS

| 1,034,618 | A | * | 8/1912 | Holcombe | ........... B65G 47/647 193/27 |
| 4,621,745 | A | * | 11/1986 | Grace | ...................... B65G 1/08 193/40 |
| 4,977,999 | A | * | 12/1990 | Smock | ..................... B65G 1/08 193/35 SS |
| 5,111,963 | A | * | 5/1992 | Grace, Sr. | ................ B65G 1/08 193/27 |
| 5,236,104 | A | * | 8/1993 | Stingel, Jr. | .............. G07F 11/34 193/27 |
| 5,636,966 | A | * | 6/1997 | Lyon | .................... B65G 1/1378 414/791.6 |
| 5,779,094 | A | * | 7/1998 | Stingel, Jr. | ............... B65G 1/08 221/2 |
| 7,401,709 | B2 | * | 7/2008 | Stingel, Jr. | ........... B65G 11/086 193/27 |
| 2002/0104736 | A1 | * | 8/2002 | Peppel | ................. B65G 47/647 198/369.2 |

* cited by examiner

*Primary Examiner* — James R Bidwell
(74) *Attorney, Agent, or Firm* — Patterson + Sheridan, LLP (57) ABSTRACT

Embodiments herein describe a decline station for moving items between two structures at different heights. In one embodiment, the decline station includes a receiving ramp which receives an item from the first, upper structure. The receiving ramp is aligned with a pivot ramp so that items can be transferred from the receiving ramp onto the pivot ramp. The pivot ramp includes at least two positions: a receiving position where the pivot ramp is coplanar with the receiving ramp and a discharge position where the pivot ramp is aligned with another, lower ramp in the station—e.g., another pivot ramp or a discharge ramp. The item is transferred between ramps until it is eventually discharged onto a second, lower structure.

17 Claims, 12 Drawing Sheets

DECLINE STATION

BACKGROUND

The present invention relates to moving items between structures arranged at different heights, and more specifically, to a decline station which includes at least one pivot ramp for transferring items between the structures.

Warehouses typically include ramps or slides for transferring items between structures such as between two conveyor belts or from a conveyor belt to a storage area (e.g., a pallet box or a processing station). As the height difference between the two structures increases, so does the length of the ramp in order to maintain the same slope. For example, a height difference of five feet between the two structures may require a ramp with a length of ten to twelve feet. Increasing the length of the ramp increases the spacing between the two structures which can result in an inefficient use of floor space in a warehouse.

DETAILED DESCRIPTION

Embodiments herein describe a decline station for moving items between two structures at different heights. In one embodiment, the decline station includes a receiving ramp which receives an item from a first, upper structure. The receiving ramp may be inclined and include sliding or rotating elements so that gravity causes the received items to travel down until reaching a pivot ramp. For example, when in a receiving position, the pivot ramp is coplanar with the receiving ramp such that the items can move from the receiving ramp onto the pivot ramp.

The pivot ramp includes a pivot point which permits the pivot ramp to pivot or rotate down from the receiving position to a discharge position. When in the discharge position, the pivot ramp is coplanar with another ramp in the decline station—either another pivot ramp or a discharge ramp. The discharge ramp can also be inclined and include sliding or rotating elements so that a received item is moved onto a second, lower structure. By using one or more pivot ramps, the decline station can move items from a higher structure to a lower structure.

Figure 1A:
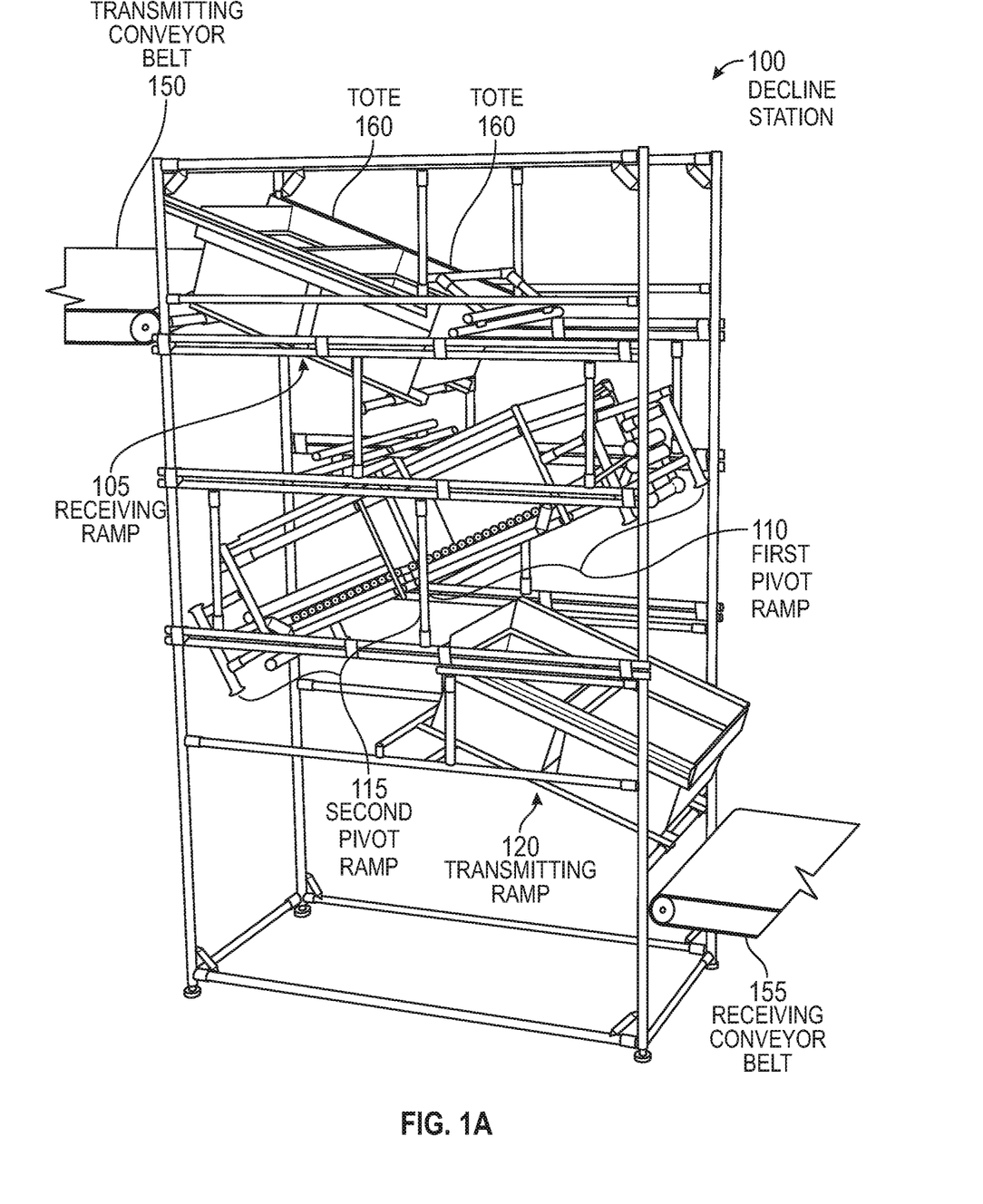
FIGS. 1A and 1B illustrate a decline station for transferring items between two structures at different heights, according to various embodiments.
Figure 1B:
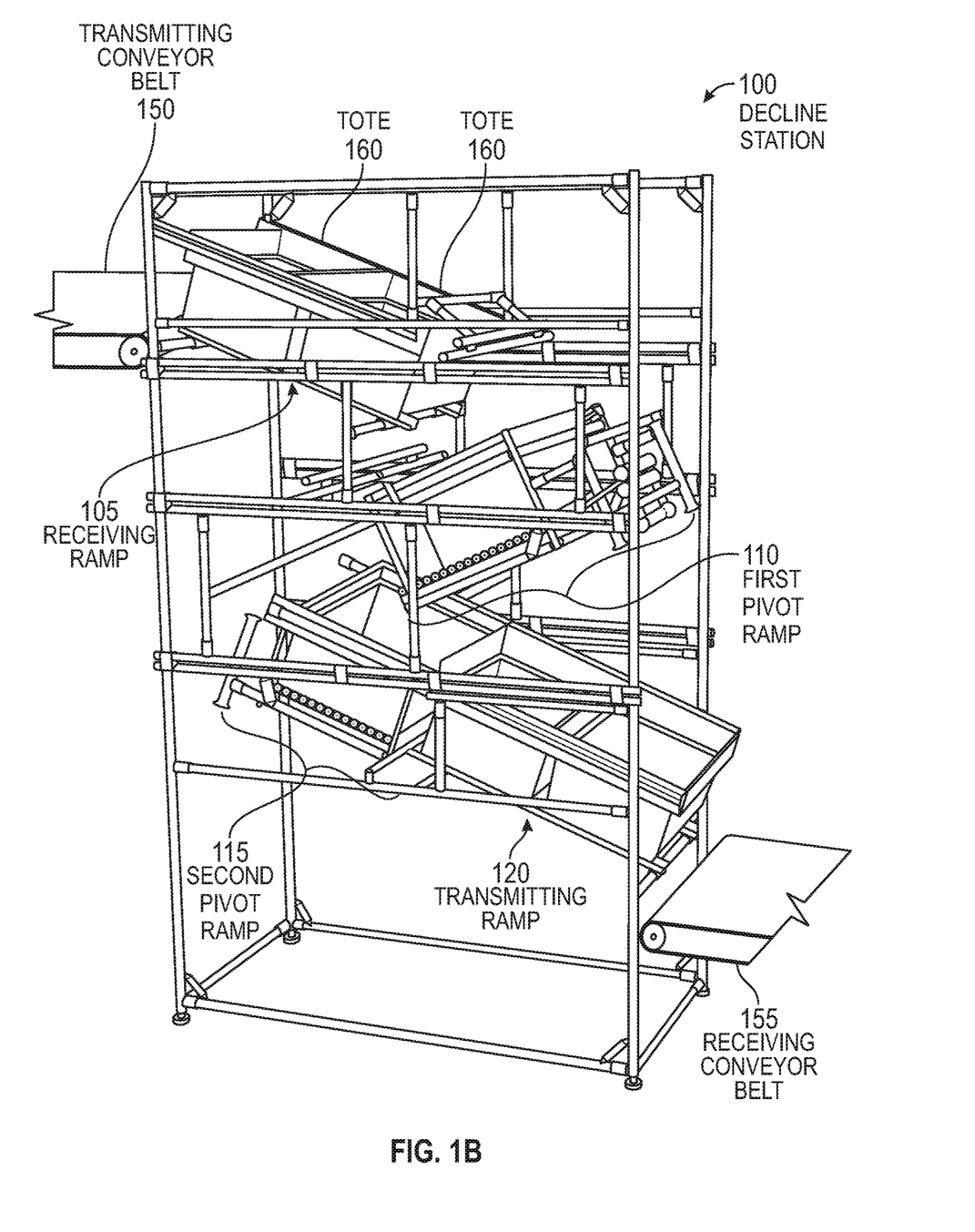

FIGS. 1A and 1B illustrate a decline station 100 for transferring items between two structures at different heights, according to various embodiments. In this example, the decline station 100 is positioned between a transmitting conveyor belt 150 and a receiving conveyor belt 155. That is, the transmitting conveyor belt 150 provides items (totes 160, in this example) to the decline station 100 which then moves the items in a zig zag pattern until they are discharged onto the receiving conveyor belt 155. Although the embodiments and figures herein illustrate transmitting totes 160 between an upper structure (e.g., the conveyor belt 150) to a lower structure (e.g., the conveyor belt 155), the decline station 100 can be used to move a variety of items such as packages, cardboard boxes, mail, and the like.

The zig zag pattern for moving the items through the decline station 100 is established by a receiving ramp 105, a first pivot ramp 110, a second pivot ramp 115, and a transmitting ramp 120. The receiving ramp 105 is aligned with the transmitting conveyor belt 150 to receive the totes 160 that should be transferred to the receiving conveyor belt 155. In this example, the receiving ramp 105 is tilted or sloped so that the totes 160 move down the ramp 105 in response to a gravitational pull. In one embodiment, the receiving ramp 105 includes roller elements or sliding elements for aiding gravity to move the totes 160 down the receiving ramp 105. Further, the position of the receiving ramp 105 in the decline station 100 may be fixed.

Although not shown in FIGS. 1A and 1B, the first pivot ramp 110 aligns with the receiving ramp 105 when in a receive position. As such, the totes 160 slide or roll off of the receiving ramp 105 onto the first pivot ramp 110. In one embodiment, the weight of the tote 160 causes the first pivot ramp 110 to pivot downward form the receiving position to a discharge position, which is the position of the ramp 110 shown in FIG. 1A. For example, the first pivot ramp 110 may be counterbalanced using weights which move and maintain the pivot ramp 110 in the receive position until a tote 160 moves onto the first pivot ramp 110 where the additional weight of the tote 160 causes the pivot ramp 110 to move to the discharge position illustrated in FIG. 1A. In another example, the first pivot ramp 110 may be switched between the receive and discharge positions using a motor or other actuator.

When in the discharge position as shown in FIG. 1A, the first pivot ramp 110 aligns with the second pivot ramp 115 in its receive position. Aligning the first and second pivot ramps 110, 115 permits the tote 160 loaded onto the first pivot ramp 110 to move onto the second pivot ramp 115. Like the receiving ramp 105, the first and second pivot ramps 110, 115 can include rolling or sliding elements for facilitating the transfer of the tote 160 between the ramps 110, 115. While rolling elements (e.g., rollers) can generate more noise than using sliding elements, the ramps can include sound dampeners. Moreover, rubber rollers can be used to reduce the noise.

Using counterbalances or an actuator, the second pivot ramp 115 moves from the receive position shown in FIG. 1A to a discharge position shown in FIG. 1B. When in the discharge position illustrated in FIG. 1B, the second pivot ramp 115 aligns with the transmitting ramp 120. When aligned, the tote 160 on the second pivot ramp 115 transfers onto the transmitting ramp 120. In this embodiment, the transmitting ramp 120 is sloped or tilted so that gravity moves the tote down the transmitting ramp 120 and onto the receiving conveyor belt 155. In this manner, the receiving ramp 105, the first and second pivot ramps 110, 115, and the transmitting ramp 120 form a zig zap pattern which can be used to transfer totes 160 between conveyor belts 150 and 155 at different heights.

One advantage of the decline station 100 is that it permits the conveyor belts 150 and 155 to be spaced closer together in the warehouse than they could be otherwise if a ramp or slide was used to transfer the totes 160. Spacing the conveyor belts 150 and 155 closer together can save space in the floor of the warehouse which permits the density of machines in the warehouse to be increased.

Figure 2:
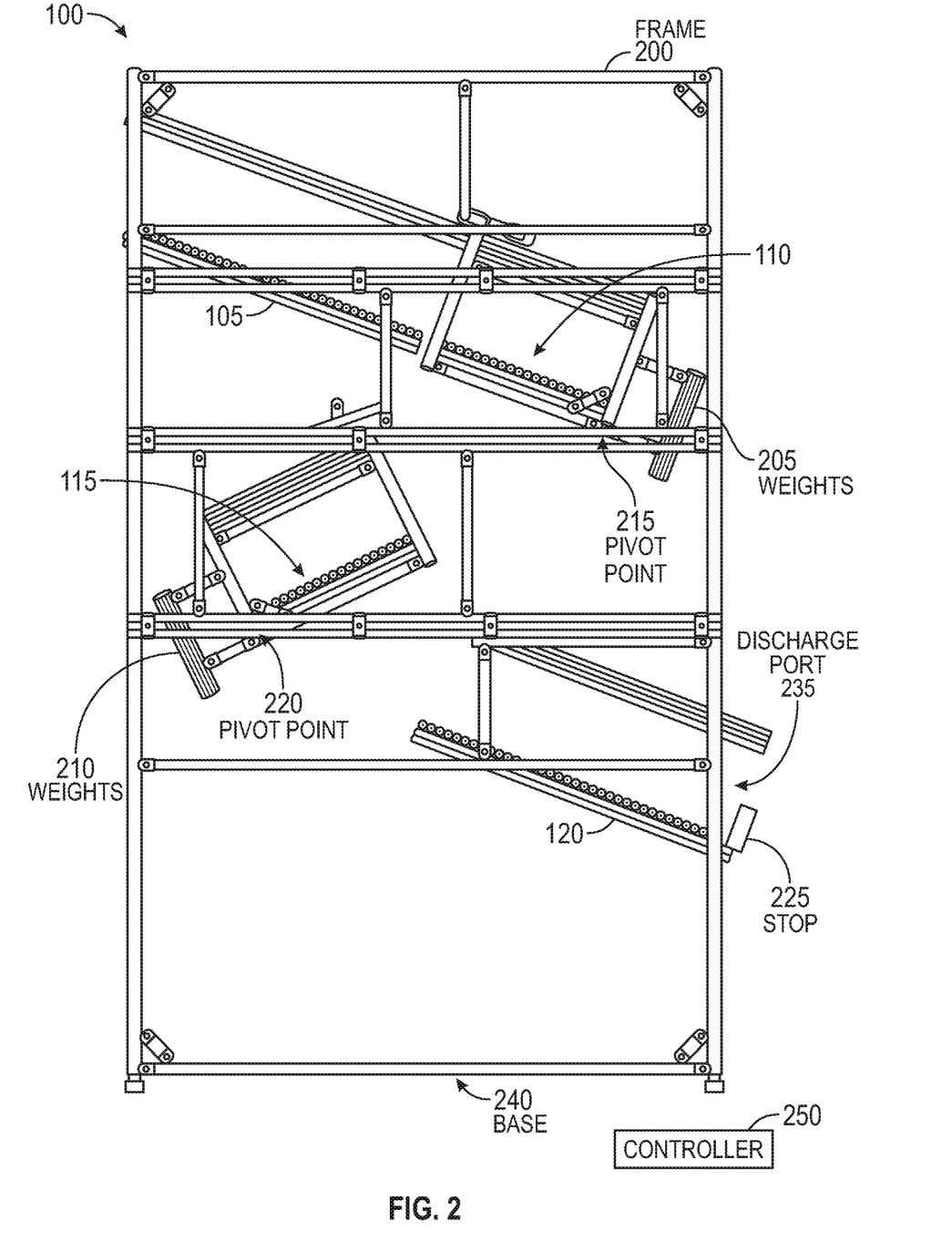
FIG. 2 illustrates a side view of a decline station in a default state, according to various embodiments.

FIG. 2 illustrates a side view of the decline station 100 in a default state, according to various embodiments. The decline station 100 includes a frame 200 which supports the ramps 105, 110, 115, and 120. The frame 200 can be made from any suitable rigid material such as metal, plastic, or polymer.

FIG. 2 illustrates the positions of the first and second pivot ramps 110, 115 when the decline station 100 is in a default state. In one embodiment, the default state is when the first and second pivot ramps 110, 115 are in their receive positions. That is, the decline station 100 may not currently have any totes on the ramps 105, 110, 115, and 120. As such, the first and second pivot ramps 110, 115 are moved into their respective receive positions so that the decline station 100 is prepared to receive a new item at the receiving ramp 105.

In FIG. 2, the first and second pivot ramps 110, 115 include respective pivot points 215 and 220 which define axes around which the first and second pivot ramps 110, 115 pivot. The specific rotation of the pivot ramps 110, 115 around the pivot points 215, 220 is described and shown later. In this example, the first pivot ramp 110 includes counterbalance weights 205 which use gravity to rotate or swivel the first pivot ramp 110 around the pivot point 215 into the receive position illustrated in FIG. 2. Similarly, the second pivot ramp 115 include counterbalance weights 210 which use gravity to rotate or swivel the second pivot ramp 115 around the pivot point 220 into the receive position illustrated in FIG. 2. As discussed below, once a tote (or other item) is loaded onto the pivot ramps 110, 115, they can move from the receive positions into discharge positions thereby changing the decline station 100 from the default state. Once the item is discharged from the decline station 100, gravity causes the counterbalance weights 205, 210 to move the first and second pivot ramps 110, 115 into their receive positions, which changes the decline station 100 back into the default state.

FIG. 2 also includes a controller 250 which can be a computing system, programmable logic controller, or other type of logic device for monitoring and controlling the decline station 100. For example, the controller 250 can control a stop 225 at the end of the transmitting ramp 120 which permits items to leave the decline station 100 at a discharge port 235 (e.g., an end of the transmitting ramp 120). In other example, the controller 250 can monitor sensors (optical sensors or light curtains) which detect the locations of items in the decline station 100. Also, the decline station 100 may include stops at the ends of other ramps in the station 100 which are actuated by the controller 250. Furthermore, in other embodiments the first and second pivot ramps 110, 115 may be rotated along the pivot points 215, 220 using actuators or motors controlled by the controller 250.

As shown, the decline station 100 moves items from the receiving ramp 105 near the top of the frame 200 to the transmitting ramp 120 near a base 240 of the decline station 100. As such, the receiving ramp 105 is disposed a greater distance from the base 240 of the decline station 100 than the discharge port 235 where the items are discharged from the station 100.

Figure 3:
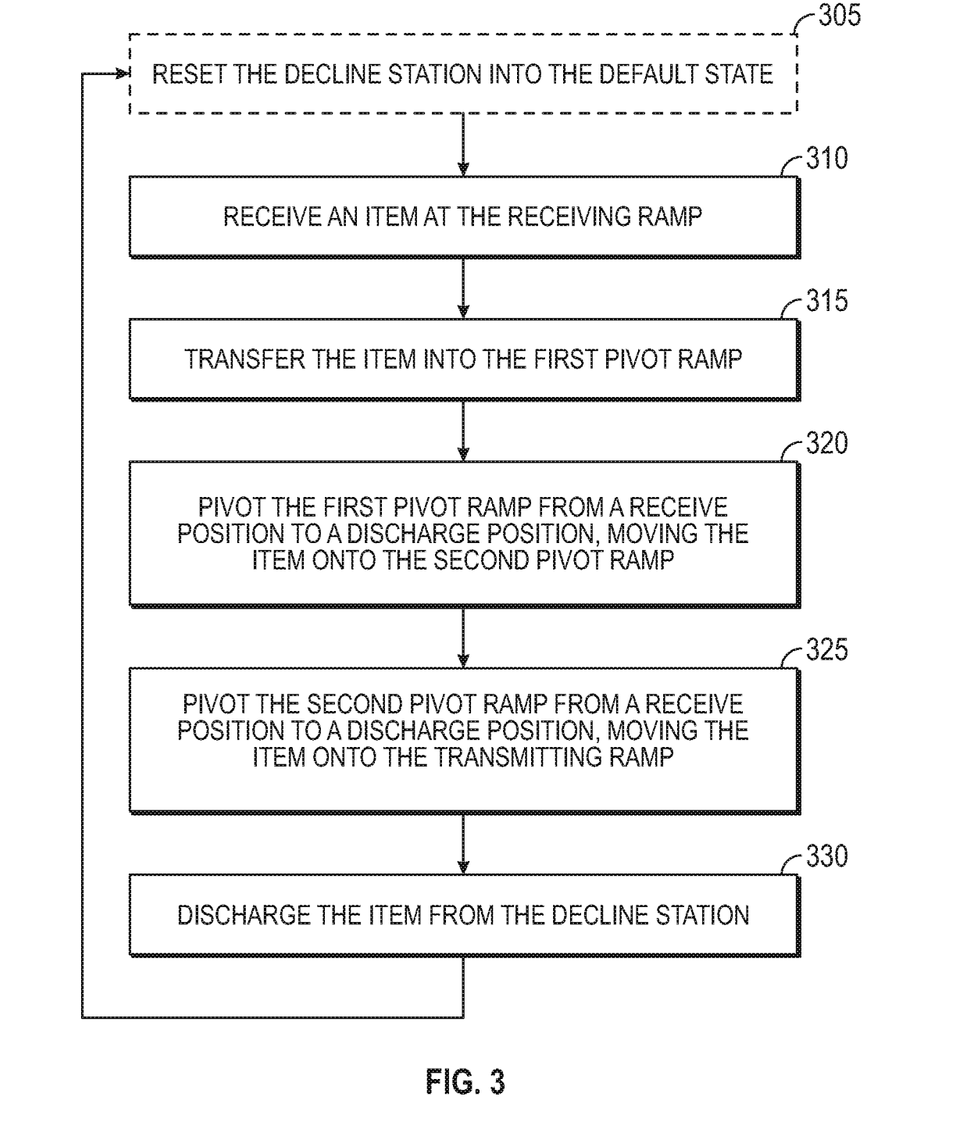
FIG. 3 is a flowchart of moving an item between two structures using a decline station, according to various embodiments.

FIG. 3 is a flowchart of a method 300 for moving an item between two structures using a decline station, according to various embodiments. At block 305, the decline station resets into the default state—e.g., the default state illustrated in FIG. 2. For example, the controller may issue instructions which change the positions of the pivot ramps in the decline station to the default state. However, the block 305 is optional since in one embodiment the decline station resets to the default state automatically (without receiving instructions from the controller). For example, in FIG. 2, the counterbalance weights 205 and 210 can automatically move the first and second pivot ramps 110, 115 into receive positions corresponding to the default state anytime the ramps 110, 115 do not have items on them.

Figure 4A:
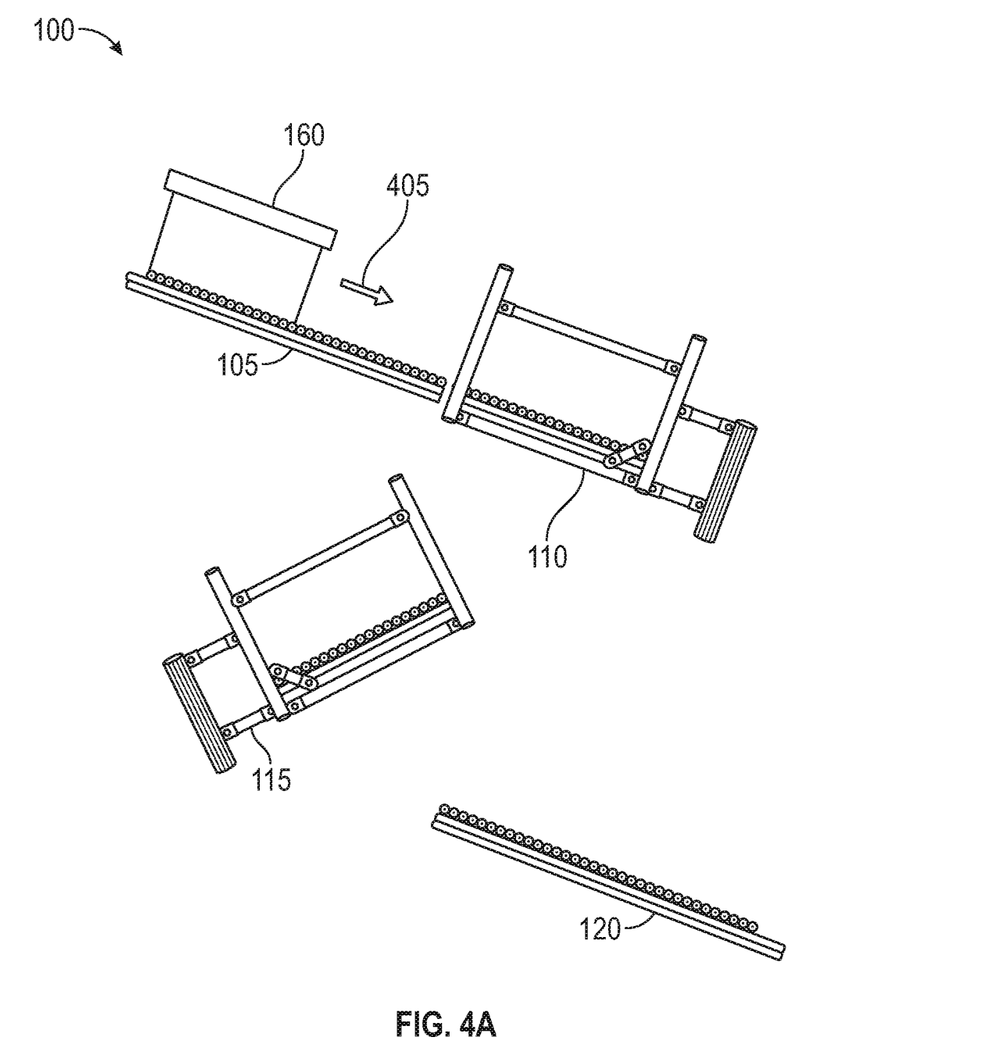
FIGS. 4A-4E illustrate different states of operation of a decline station, according to various embodiments.

For clarity, the remaining blocks of the method 300 are discussed in tandem with FIGS. 4A-4E which illustrate different states of operation of the decline station 100, according to various embodiments. At block 310, the receiving ramp of the decline station receives an item. FIG. 4A illustrates an item (e.g., tote 160) loaded on the receiving ramp 105. The receiving ramp 105 is sloped and can include rolling or sliding elements which cause the tote 160 to move in the direction of arrow 405.

Figure 4B:
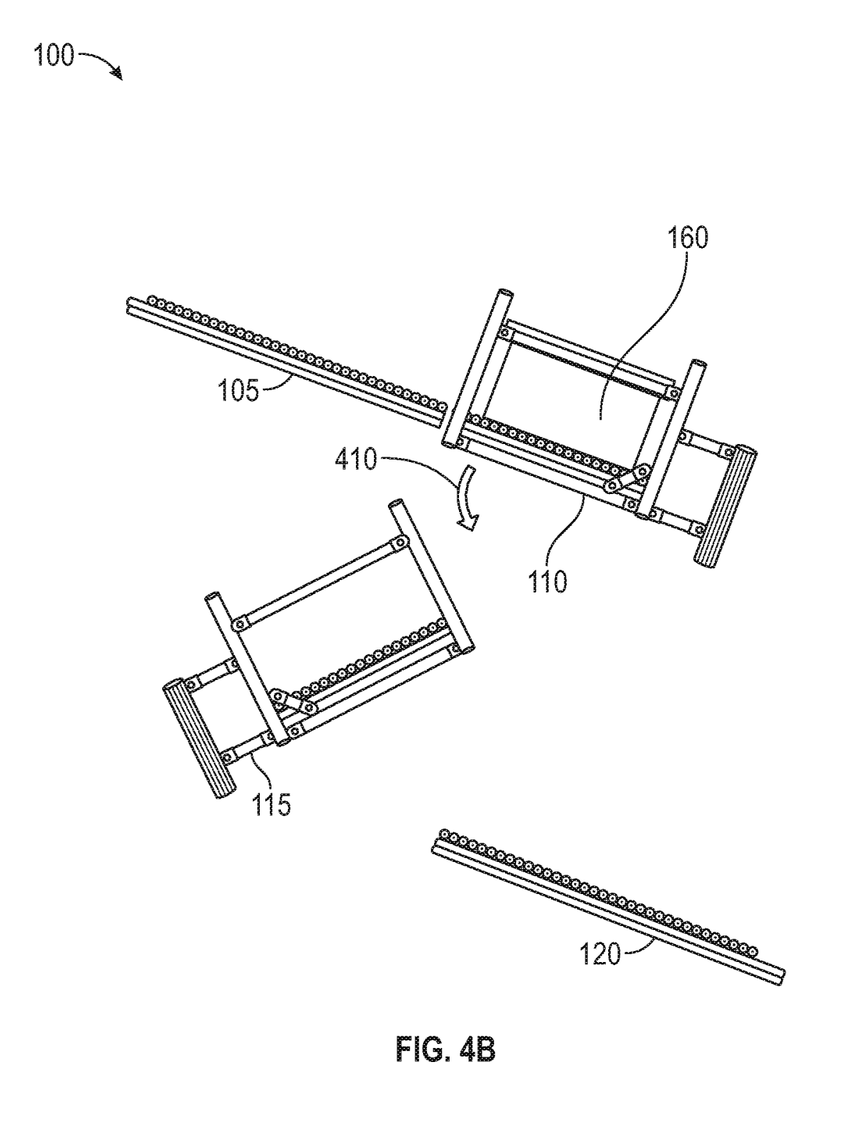

At block 315, the receiving ramp transfers the item onto the first pivot ramp. This is illustrated in FIG. 4B where the tote 160 has moved from the receiving ramp 105 onto the first pivot ramp 110. Although not shown, the first pivot ramp 110 can include a stop on its right side to prevent the tote 160 from continuing to move downward on the first pivot ramp 110.

Figure 4C:
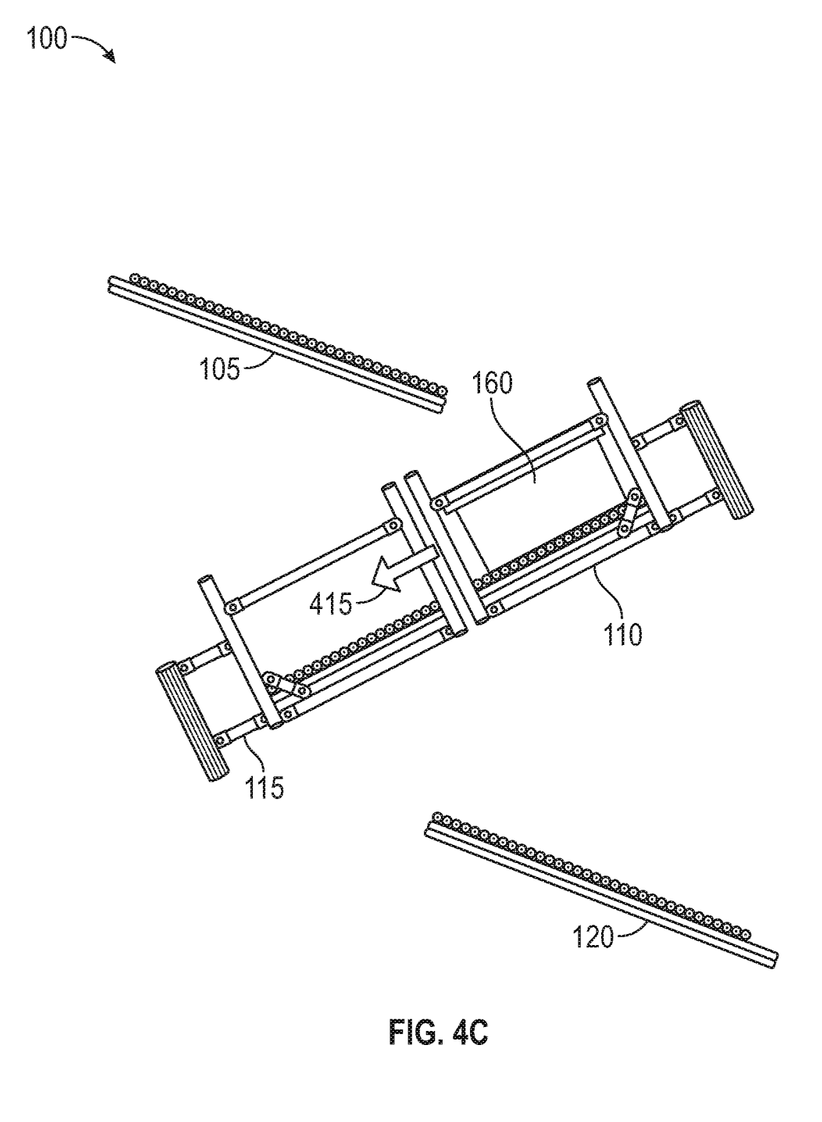

At block 320, the first pivot ramp pivots from a receive position to a discharge position, thereby moving the item onto the second pivot ramp. In FIG. 4B, the first pivot ramp 110 pivots as shown by the arrow 410 from the receive position to the discharge position illustrated in FIG. 4C. In one embodiment, the weight of the tote 160 causes the first pivot ramp 110 to pivot as shown by the arrow 410. For example, the weight of the tote 160 may counter the weights attached to the right side of the first pivot ramp 110 so that the left end of the ramp 110 swings down to align with the second pivot ramp 115 as shown in FIG. 4C. Alternatively, the first pivot ramp 110 may include a sensor (e.g., an optical eye) that detects the presence of the tote 160. In response, the controller can instruct a motor or actuator controlling the first pivot ramp 110 to swing down as indicated by the arrow 410.

FIG. 4C illustrates the state of the decline station 100 when the first pivot ramp 110 is in the discharge position and the second pivot ramp 115 is in the receive position. The ramps 110, 115 are aligned so that the tote 160 can be transferred to the second pivot ramp 115 as shown by arrow 415. In one embodiment, the movement of the tote 160 is caused by gravity and the downward slope of the first pivot ramp 110. However, in another embodiment, the first pivot ramp 110 (or any of the ramps in the decline station 100) may include actuators (e.g., powered rollers or a conveyor belt) which discharge the tote 160 onto the second pivot ramp 115 rather than relying solely on gravity.

Further, while the embodiments herein describe moving items from an upper structure to a lower structure, if the ramps include powered rollers or conveyor belts, the decline station 100 could be used to move items from the lower structure to the upper structure.

In one embodiment, the left end of the first pivot ramp 110 includes a stop or catch which prevents the tote 160 from transferring from the first pivot ramp 110 to the second pivot ramp 115. For example, the stop or catch may allow the tote 160 to transfer onto the first pivot ramp 110 from the receiving ramp 105 when moving in the direction shown by arrow 405 in FIG. 4A but stops the tote 160 from moving in the direction of arrow 415. The controller can lower or disable the stop when the first and second pivot ramps 110, 115 are aligned, thereby permitting the first pivot ramp 110 to transfer the tote 160 onto the second pivot ramp 115.

However, in another embodiment, the decline station 100 does not have a stop or catch to prevent the movement of the tote 160 as illustrated by the arrow 415. For example, the tote 160 may not begin moving in the direction of the arrow 415 until the first and second pivot ramps 110, 115 are aligned, or are at least sufficiently aligned, so that the tote 160 can move safely and effectively between the ramps 110, 115.

Figure 4D:
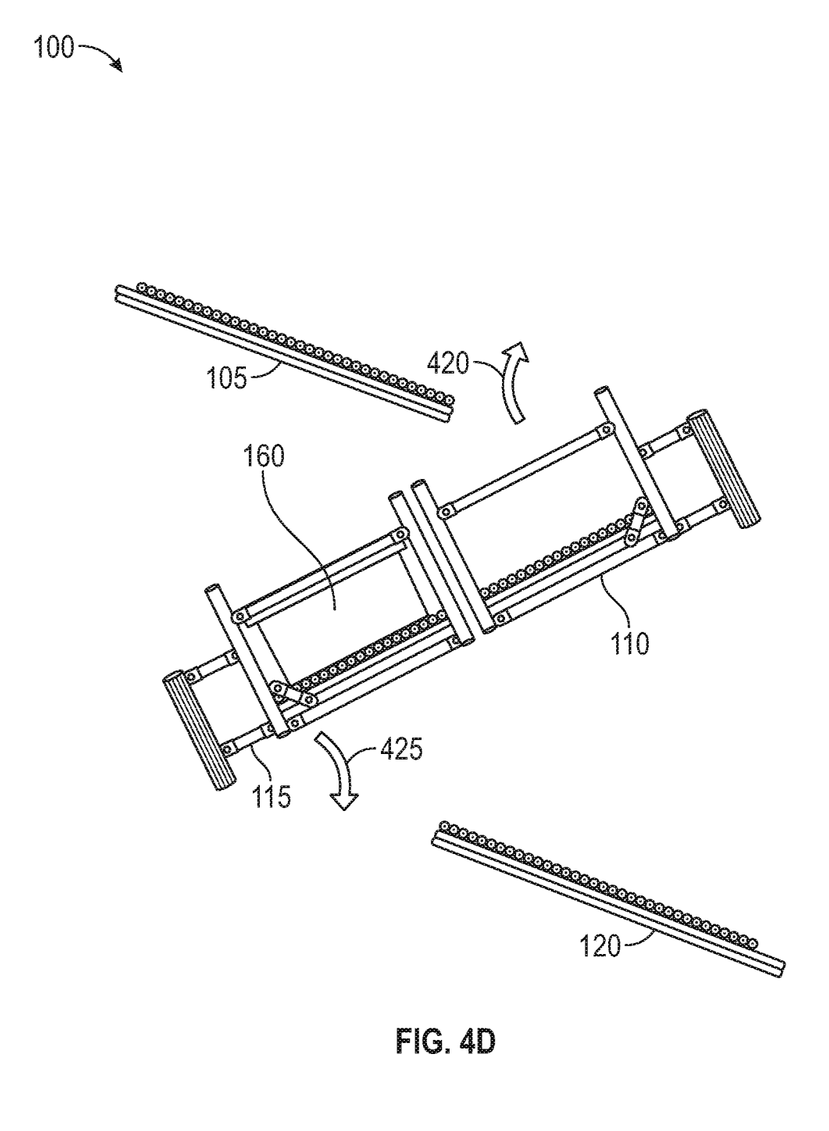

At block 325, the second pivot ramp pivots from the receive position to the discharge position, thereby moving the item onto the transmitting ramp. FIG. 4D illustrates that the tote 160 has transferred onto the second pivot ramp, and in response, the second pivot ramp 115 begins to pivot downward as indicated by arrow 425. For example, like the first pivot ramp 110, the second pivot ramp 115 can be gravity driven so that the added weight of the tote 160 causes the ramp 115 to pivot to the discharge position. Alternatively, the ramp 115 can be motor driven.

In addition, the first pivot ramp 110 pivots upwards as indicated by arrow 420 to return to the receive position. For example, once the tote 160 transfers to the second pivot ramp 115, the counterbalanced weights on the first pivot ramp 110 cause the ramp 110 to swing upwards as indicated by arrow 420 to again align with the receiving ramp 105 in the receive position. If motor driven, the controller can cause the first pivot ramp 110 to return to the receive position. In one embodiment, the first pivot ramp 110 may move into the receive position at the same time the second pivot ramp 115 moves to the discharge position, although this is not a requirement.

In one embodiment, the second pivot ramp 115 includes a stop that prevents the tote 160 from sliding off the left side of the second pivot ramp 115.

Figure 4E:
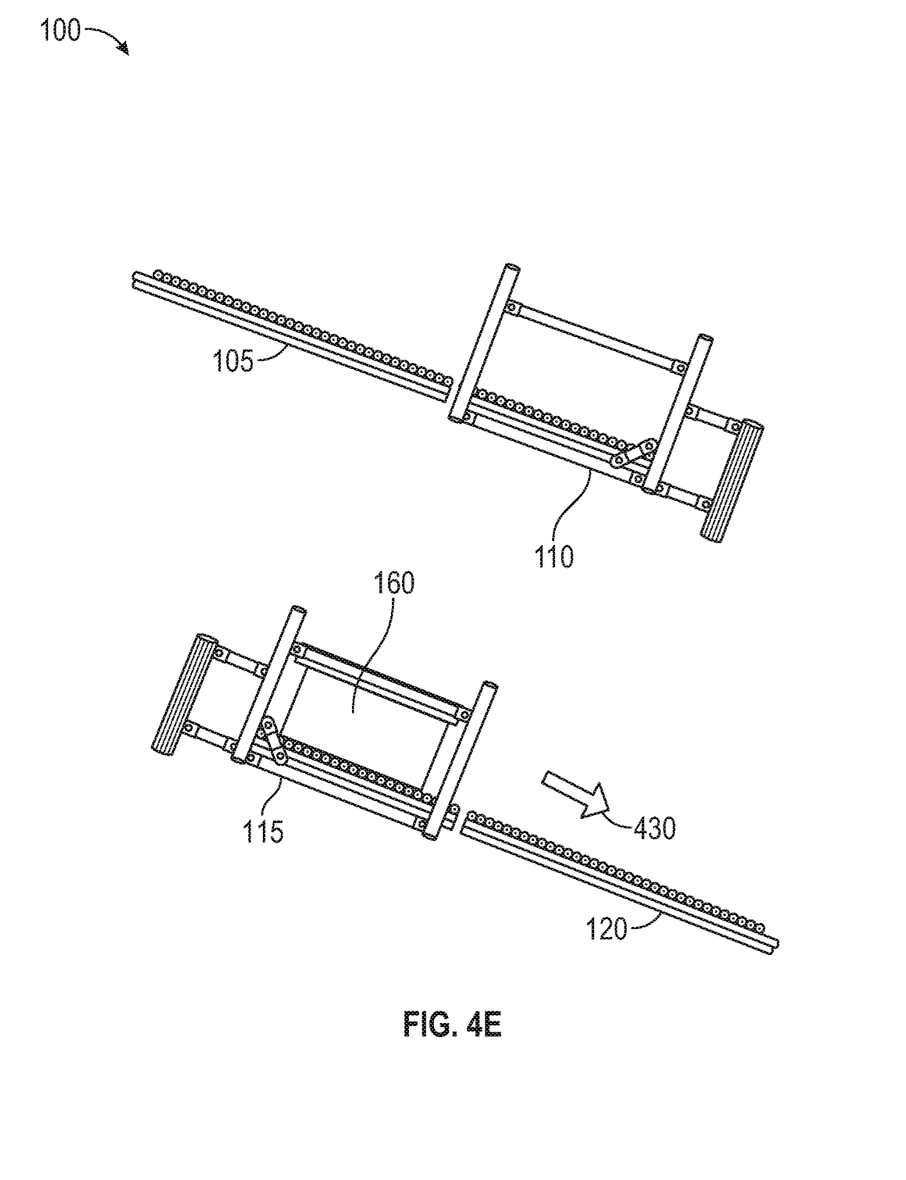

FIG. 4E illustrates a state of the decline station 100 where the second pivot ramp 115 is in the discharge position aligned to the transmitting ramp 120, while the first pivot ramp 110 is in the receive position aligned to the receiving ramp 105. In one embodiment, the slope of the second pivot ramp 115 (along with optional rolling or sliding members) permits gravity to transfer the tote 160 from the second pivot ramp 115 onto the transmitting ramp 120 as illustrated by arrow 430.

In one embodiment, the second pivot ramp 115 includes a stop or catch on the right end of the second pivot ramp 115 that prevents the tote 160 from moving along the direction of the arrow 430 until a controller disables or releases the stop. For example, the controller may wait until the second pivot ramp 115 is aligned with the transmitting ramp 120, or until a tote on the transmitting ramp 120 has been discharged, before disabling the stop so that the tote 160 can transfer from the second pivot ramp 115 onto the transmitting ramp 120. However, in another embodiment, the tote 160 is free to move from the second pivot ramp 115 to the transmitting ramp 120 without any controllable stop preventing it.

At block 330, the transmitting ramp discharges the item from the decline station. In one embodiment, the tote 160 slides over the transmitting ramp and onto another structure (e.g., a conveyor belt). Alternatively, the right end of the transmitting ramp 120 can include a stop with prevents the tote 160 from leaving the decline station 100. The controller may wait until receiving a signal from the downstream structure indicating the structure is ready for the tote 160 before discharging the tote 160. For example, the decline station 100 may discharge the totes 160 into a package loading station which places items in the totes 160. As such, the decline station 100 may wait until the package loading station requests another tote before ejecting the tote 160 from the transmitting ramp 120. In this example, the decline station can serve as a buffer for a downstream machine or processing station.

Figure 5:
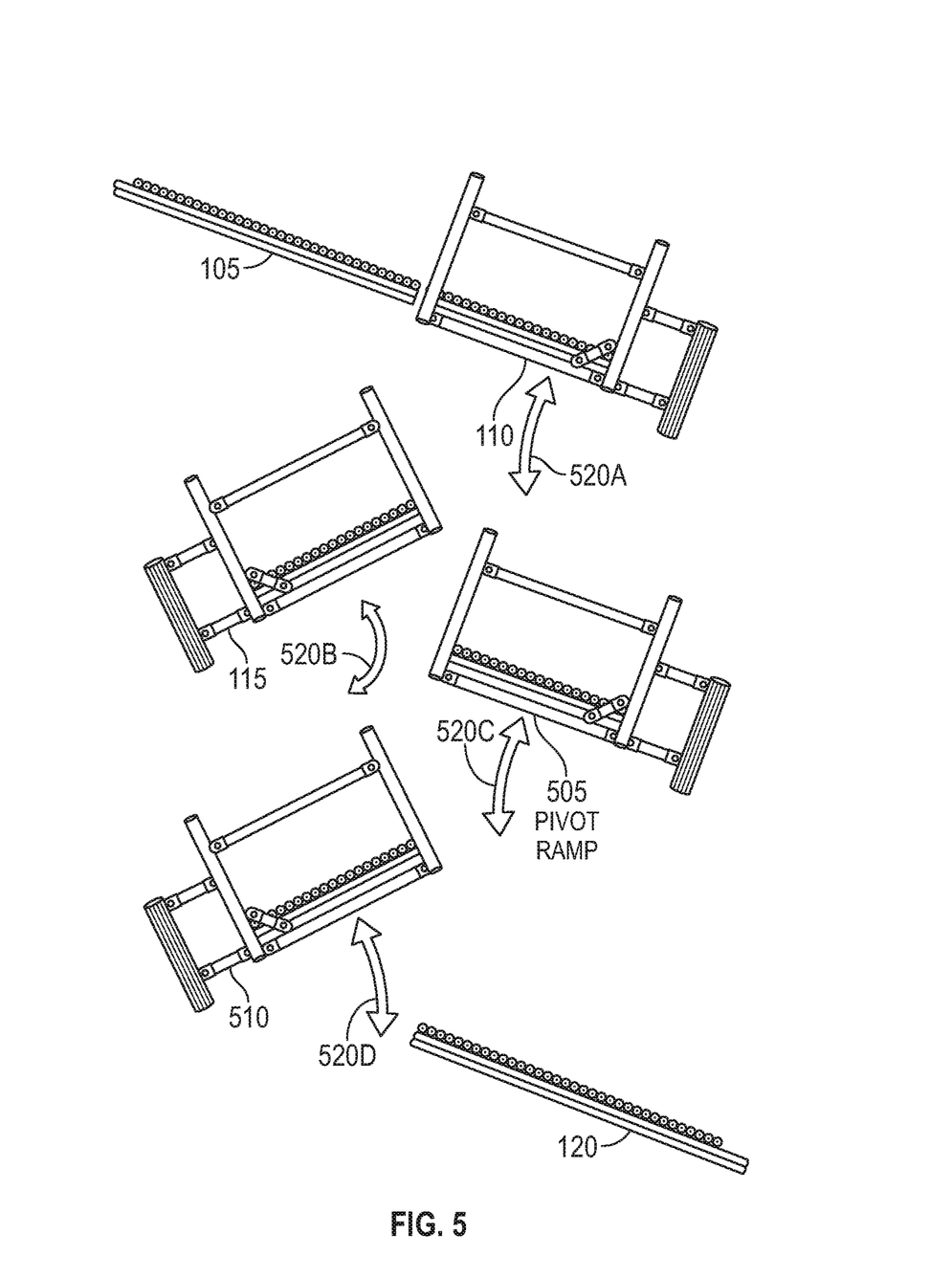
FIG. 5 illustrates a decline station with multiple pairs of pivot ramps, according to various embodiments.

FIG. 5 illustrates a decline station 500 with multiple pairs of pivot ramps, according to various embodiments. Unlike the decline station 100 illustrated in FIG. 1 which has a pair of pivot ramps, here the decline station 500 includes two pairs of pivot ramps forming a zig zag pattern. That is, the decline station 500 includes the first and second pivot ramps 110, 115 as well as a third pivot ramp 505 and a fourth pivot ramp 510. In this example, the pivot ramps 110, 115, 505, and 510 are shown in their receive positions which may define a default state of the decline station 500. Arrows 520A-520D illustrate the respective movement of the pivot ramps 110, 115, 505, and 510 when transferring from a receive position to a discharge position.

The third and fourth pivot ramps 505, 510 can operate like the first and second pivot ramps 110, 115. That is, when the third pivot ramp 505 is in the receive position and the second pivot ramp 115 is in the discharge position, the two ramps 115, 505 can align so that an item on the second pivot ramp 115 can be transferred onto the third pivot ramp 505. Similarly, when the third pivot ramp 505 is in the discharge position and the fourth pivot ramp 510 is in the receive position, the ramps 505, 510 are aligned so that an item on the third pivot ramp 505 can be transferred onto the fourth pivot ramp 510. Further, the fourth pivot ramp 510 can rotate to the discharge position to align with the stationary transmitting ramp 120 so that the item can be transferred onto the ramp 120 and discharged from the decline station 500.

The decline station 500 may be preferred as the height difference between the structure interfacing with the receiving ramp 105 and the structure interfacing with the transmitting ramp 120 increases. For example, to move items between two structures with very different heights using the decline station 100 may require increasing the lengths of the ramps. Increasing the length of the ramps, however, may increase the overall width of the decline station 100, thereby causing the two structures to be spread further apart. Instead, because the decline station 500 includes multiple pairs of pivot ramps, the decline station 500 can have shorter ramp lengths and a shorter overall width than the decline station 100 for moving items the same vertical distance between two structures. As a result, the two structures can be placed closer together thereby improving the density of structures in the warehouse. As the height difference between the two structures interfacing with the decline station 500 increases, the length of the ramps in the decline station 500 can also decrease, or additional pairs of ramps can be added to the decline station 500.

Although decline stations 100 and 500 illustrate using a pair of pivot ramps, the embodiments are not limited to such. Using pairs of pivot ramps may be desired when the structure providing the items to the decline station is on one side of the station while the structure receiving the items is on an opposite side of the station. In another embodiment, the two structures may be on the same side of the decline station. For example, referring to FIG. 1, the receiving conveyor belt 155 could extend underneath the transmitting conveyor belt 150, in which case, both structures interface with the decline station 100 on its left side. In this case, the second pivot ramp 115 can be replaced with the fixed transmitting ramp 120. There, the decline station includes only one pivot ramp (e.g., the first pivot ramp 110) which transfers the packages between the receiving ramp 105 and the transmitting ramp 120. As the height between the conveyor belts 150, 155 increases, the decline station can include additional pivot ramps. For example, referring to FIG. 5, the fourth pivot ramp 510 could be replaced by the fixed transmitting ramp 120 so that items are transmitted between the first receiving ramp 105, the first pivot ramp 110, the second pivot ramp 115, the third pivot 505, and then onto the transmitting ramp 120 to be discharged onto the lower conveyor belt. Thus, the number of pivoting ramps in a decline station can vary depending on the height different between the transmitting and receiving structures as well as where those structures are located relative to the decline station.

Figure 6:
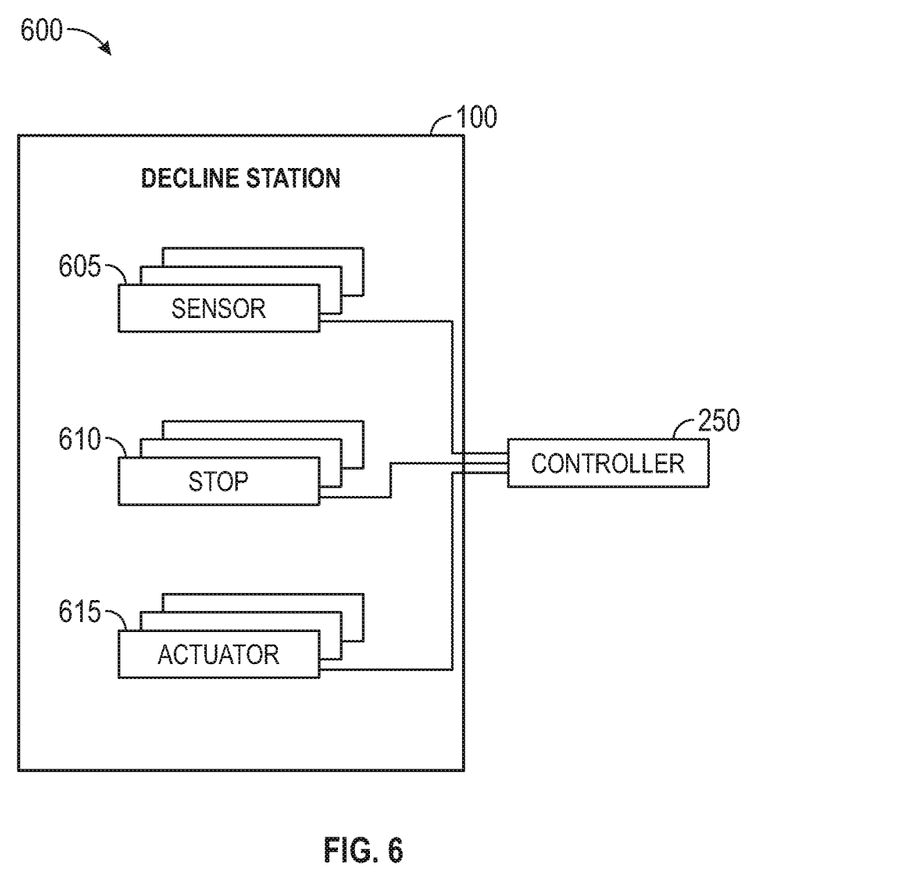
FIG. 6 illustrates a control system for a decline station, according to various embodiments.

FIG. 6 illustrates a control system 600 for the decline station 100, according to various embodiments. The decline station 100 includes multiple sensors 605 and multiple stops 610 which are communicatively coupled to the controller 250. For example, the decline station 100 may include sensors 605 disposed at different locations in the decline station 100 such as at the beginning of the receiving ramp to indicate when an item is received at the decline station 100, a sensor at the beginning on the pivot ramps to track the items within the decline station 100, and/or a sensor at the end of the transmitting ramp to identify when an item is ready to be discharged (or has been discharged) from the decline station 100. The sensors 605 can be optical or pressure sensors which provide state information to the controller 250.

The controller 250 can include logic (e.g., software, hardware, or firmware) that uses the state information provided by the sensors 605 to control the stops 610 or other mechanical elements in the decline station 100 such as actuators 615 controlling the pivot ramps. For example, the decline station 100 can include a stop at the beginning of the receiving ramp that prevents new items from entering the decline station 100. The controller 250 may disengage the stop 610 only after the sensors 605 indicate there are no items currently in the decline station 100. In another example, a sensor 605 attached to a pivot ramp can indicate whether the ramp is in the receive or discharge position. The controller 250 may first ensure the pivot ramp is in the receive position before disengaging the stop to enable an item to enter the decline station.

In yet another example, the stops 610 can be arranged at the ends of the fixed ramps (e.g., the receiving and transmitting ramps) and the pivot ramps to control the transfer of items between the ramps. In one embodiment, the decline station 100 can be used to buffer a plurality of items for a downstream machine or processing station. That is, rather than permitting only one item into the decline station 100 at a time, the controller 250 may permit two, three, four, etc. items to be queued up on the ramps. For example, a sensor 605 may indicate that the transmitting ramp is currently storing an item which cannot yet be discharged to the downstream machine (e.g., the machine is not yet ready). If another sensor 605 reports that the second pivot ramp has received an item, the controller 250 may instruct a stop 610 at the end of the second pivot ramp to hold the item on the second pivot ramp until the transmitting ramp has discharged its item and is ready for the item currently queued on the second pivot ramp. A similar process can be used to hold items on other ramps in the decline station. As an item is discharged, the controller 250 can activate the stops and change the positions of the pivot ramps to move queued items down the decline station to the next ramp.

Figure 7:
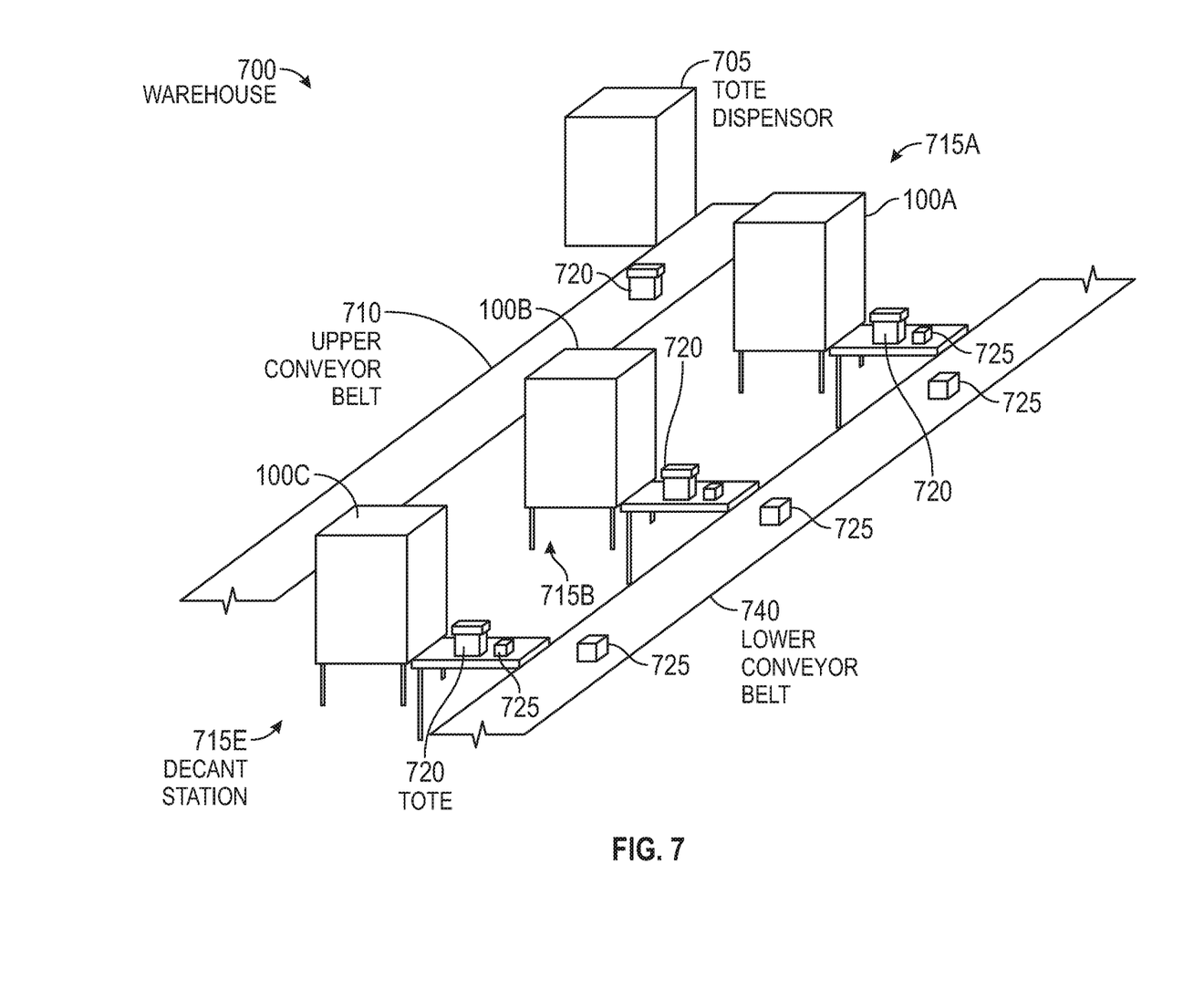
FIG. 7 illustrates using decline stations in decant stations, according to various embodiments.

FIG. 7 illustrates using decline stations 100A-100C in decant stations 715A-715C in a warehouse 700, according to various embodiments. The warehouse 700 includes a tote dispenser 705 which outputs totes 720 onto an upper conveyor belt 710. In one embodiment, the tote dispenser 705 removes individual totes from a stack of totes and discharges the totes one at a time onto the conveyor belt 710.

The decline stations 100 are disposed at intervals along the upper conveyor belt 710. In one embodiment, the upper conveyor belt 710 includes actuators along a side wall that can push the tote 720 into one of the decline stations 100 as the totes 720 travel along the length of the conveyor belt 710. For example, as the tote dispenser 705 outputs a tote 720, the upper conveyor belt 710 can move the tote 720 to a corresponding one of the decline stations 100 and insert the tote 720 into the decline station 100. For simplicity, the internal ramps in the decline stations 100 are not shown, but can include any combination of ramps and control system as described above in FIGS. 1-6.

The decline stations 100 are part of decant stations 715 where associates (e.g., human workers) load items into the totes 720. The associates can retrieve packages 725 as the packages 725 move along a lower conveyor belt 740 and place the packages 725 on a table in the decant station 715. In one embodiment, the packages 725 include multiple individual items. For example, the packages 725 may be sent to the warehouse 700 from the manufacturer and contain bulk items. The associates open the packages 725, remove the items from the packages 725, and place the items in the totes 720. Doing so may make storing and then retrieving the items to fulfill future customer orders easier.

The decline stations 100 provide the totes to the associates. In one example, when the associate has finished loading items into a tote 720, the associate removes the tote which can be detected by the decant station 715 and instructs the decline station 100 to discharge another tote 720. In one embodiment, the tote dispenser 705 dispenses the totes 720 such that each decline station 100 stores at least one tote 720 that is ready to be provided to the associate. For example, the decline stations 100 may store totes 720 on the transmitting ramp and one or more totes 720 on the pivot ramps. Using sensors, the decline stations 100 can inform the tote dispenser 705 when to send another tote 720 so that the associate does not have to wait for a new, empty tote 720 after finishing loading items into the current tote 720. In this manner, FIG. 7 illustrates using a centralized tote dispenser 705 and a plurality of decline stations 100 to provide totes for associates working at multiple decant stations 715 and is only one example of using the decline station 100 to transfer items between structures at different heights.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of operating a decline station in a building, the method comprising:
    receiving, from a first structure, an item at a receiving ramp in the decline station;
    transferring the item from the receiving ramp to a first pivot ramp in the decline station;
    pivoting the first pivot ramp to align with a second pivot ramp in the decline station after the item is transferred onto the first pivot ramp;
    transferring the item from the first pivot ramp to the second pivot ramp;
    before transferring the item from the first pivot ramp to the second pivot ramp, determining using a sensor that the first pivot ramp is aligned with the second pivot ramp;
    disengaging a first stop on the first pivot ramp to permit the item to transfer to the second pivot ramp;
    pivoting the second pivot ramp to align with a transmitting ramp in the decline station after the item is transferred onto the second pivot ramp;
    transferring the item from the second pivot ramp to the transmitting ramp; and
    discharging the item from the decline station onto a second structure using the transmitting ramp, wherein the first structure is disposed a greater distance from a floor of the building than the second structure.

2. The method of claim 1, further comprising:
    before discharging the item from the decline station, disengaging a second stop at an output of the decline station thereby permitting the item to leave the decline station.

3. The method of claim 1, wherein the receiving ramp and the transmitting ramp are sloped relative to the floor of the building and have fixed positions in the decline station.

4. The method of claim 1, wherein the first pivot ramp comprises a first counterbalance weight mounted at a first end and the second pivot ramp comprises a second counterbalance weight mounted at a second end, wherein aligning the first and second pivot ramps comprises:
    aligning a third end of the first pivot ramp opposite the first end to a fourth end of the second pivot ramp opposite the second end.

5. The method of claim 4, wherein pivoting the first pivot ramp is performed by an added weight of the item on the first pivot ramp overcoming a force applied by the first counterbalance weight to hold the first pivot ramp in a current position.

6. A method, comprising:
    receiving, from a first structure, an item at a first ramp in a decline station;
    transferring the item from the first ramp to a pivot ramp in the decline station;
    pivoting the pivot ramp from a receive position aligned with the first ramp to a discharge position aligned with a second ramp, wherein the pivot ramp comprises a counterbalance weight mounted at a first end, wherein pivoting the pivot ramp is performed by an added weight of the item on the pivot ramp overcoming a force applied by the counterbalance weight to hold the pivot ramp in the receive position;
    transferring the item from the pivot ramp to the second ramp, wherein the first ramp, the pivot ramp, and the second ramp establish a zig-zig path for the item; and
    discharging the item from the decline station onto a second structure, wherein the first structure is disposed a greater distance from a base of the decline station than the second structure.

7. The method of claim 6, wherein the second ramp is disposed underneath the first ramp.

8. The method of claim 6, wherein a slope of the first ramp is the same as a slope of the pivot ramp when in the receive position and a slope of the second ramp is the same as the slope of the pivot ramp when in the discharge position.

9. The method of claim 6, wherein a force used to transfer the item from the first ramp to the pivot ramp, and from the pivot ramp to the second ramp, is provided solely by gravity.

10. The method of claim 6, further comprising:
    pivoting the pivot ramp from the discharge position to the receive position using a gravitational force on the counterbalance weight once the weight of the item has been removed from the pivot ramp.

11. The method of claim 6, wherein pivoting the pivot ramp is performed using a controllable actuator coupled to the pivot ramp.

12. The method of claim 6, further comprising:
    before transferring the item from the pivot ramp to the second ramp, determining using a sensor that the pivot ramp is aligned with the second ramp; and
    disengaging a stop on the pivot ramp to permit the item to transfer to the second ramp.

13. A decline station, comprising:
    a first ramp configured to receive an item from a first structure;
    a second ramp;
    a pivot ramp switchable between a receive position and a discharge position, wherein, when in the receive position, the pivot ramp is aligned with the first ramp such that the item is transferable from the first ramp to the pivot ramp, wherein, when in the discharge position, the pivot ramp is aligned with the second ramp such that the item is transferable from the pivot ramp to the second ramp, wherein the first ramp, the pivot ramp, and the second ramp establish a zig-zig path for the item, wherein the pivot ramp comprises a counterbalance weight mounted at a first end, and wherein switching the pivot ramp from the receive position to the discharge position is performed by an added weight of the item on the pivot ramp overcoming a force applied by the counterbalance weight to hold the pivot ramp in the receive position; and
    a discharge port configured to discharge the item onto a second structure, wherein the first ramp is disposed a greater distance from a base of the decline station than the discharge port.

14. The decline station of claim 13, wherein the second ramp is disposed between the first ramp and the base of the decline station.

15. The decline station of claim 13, wherein a slope of the first ramp is the same as a slope of the pivot ramp when in the receive position and a slope of the second ramp is the same as the slope of the pivot ramp when in the discharge position.

16. The decline station of claim 15, wherein the slopes of the first ramp, the pivot ramp, and the second ramp are set such that a force used to transfer the item from the first ramp to the pivot ramp, and from the pivot ramp to the second ramp, is provided solely by gravity.

17. The decline station of claim 13, further comprising:
a controller; and
an actuator coupled to the pivot ramp, wherein the controller is configured to control the actuator to switch the pivot ramp between the receive and discharge positions.

* * * * *